United States Patent
Johnson, Jr.

(10) Patent No.: US 6,593,972 B1
(45) Date of Patent: Jul. 15, 2003

(54) INTERACTIVE DISPLAY SYSTEM

(76) Inventor: Clark E. Johnson, Jr., P.O. Box 50116, 3315 Saint Paul Ave., Minneapolis, MN (US) 55405

(*) Notice: Subject to any disclaimer, the term of this patent is extended or adjusted under 35 U.S.C. 154(b) by 0 days.

(21) Appl. No.: 09/076,377

(22) Filed: May 12, 1998

(51) Int. Cl.[7] .................................................. H04N 7/08
(52) U.S. Cl. ...................... 348/473; 348/460; 348/465; 348/468; 348/563; 725/136; 345/719; 386/124
(58) Field of Search .................................. 348/460, 553, 348/473, 468, 552, 461, 465, 563, 480; 725/136, 51; 345/717, 718, 719; 386/124, 40, 39

(56) References Cited

U.S. PATENT DOCUMENTS

| | | | |
|---|---|---|---|
| 3,737,566 A | | 6/1973 | Baer et al. ................ 178/5.8 R |
| 3,829,095 A | | 8/1974 | Baer ....................... 273/101.1 |
| 3,993,861 A | * | 11/1976 | Baer .......................... 348/473 |
| 4,591,841 A | * | 5/1986 | Gunderson et al. ......... 345/180 |
| 4,654,700 A | | 3/1987 | Baer ............................ 358/93 |
| 4,807,031 A | * | 2/1989 | Broughton et al. ......... 348/460 |
| 5,010,499 A | * | 4/1991 | Yee ............................. 348/552 |
| 5,057,915 A | * | 10/1991 | Kohorn ......................... 463/9 |
| 5,251,301 A | * | 10/1993 | Cook .......................... 709/246 |
| 5,325,127 A | * | 6/1994 | Dinsel ......................... 348/473 |
| 5,481,296 A | * | 1/1996 | Cragun et al. ................ 348/13 |
| 5,541,662 A | * | 7/1996 | Adams et al. .............. 348/460 |
| 5,790,198 A | * | 8/1998 | Roop et al. ................. 348/460 |
| 5,946,046 A | * | 8/1999 | You et al. ................... 348/468 |
| 6,061,052 A | * | 5/2000 | Raviv et al. ................ 345/180 |
| 6,072,521 A | * | 6/2000 | Harrison et al. .............. 348/12 |
| 6,118,490 A | * | 9/2000 | Moore et al. ............... 348/473 |
| 6,147,669 A | * | 11/2000 | Bessel ........................ 345/112 |

* cited by examiner

*Primary Examiner*—John Miller
*Assistant Examiner*—Jean W. Désir
(74) *Attorney, Agent, or Firm*—Bromberg & Sunstein LLP

(57) ABSTRACT

An interactive display system is provided for use with (i) a program source having an associated video output signal and a digital data stream, the digital data stream being modulated on the video output signal, and (ii) a monitor in communication with the program source for displaying the output, the display system. The system in a preferred embodiment has a data decoder, for separating the digital data stream and a viewer control box. The control box has a user input for receiving user selections, a data input in communication with the data decoder for receiving the digital data stream, and a program execution module in communication with the user input and the data input. A video cassette for use in such a system is also provided.

15 Claims, 3 Drawing Sheets

INTERACTIVE DISPLAY SYSTEM

TECHNICAL FIELD

The present invention relates to interactive display systems, and particularly to interactive systems utilizing television receivers.

BACKGROUND ART

Interactive display systems utilizing television receivers are known in the art. U.S. Pat. No. 3,829,095, entitled "Method of Employing a Television Receiver for Active Participation," for an invention of Baer, discloses a control unit 14 having an output coupled to the antenna input of a television receiver. A device 129, coupled to an input of the control unit 14, is attached by a suction cup to the face of the television's CRT at the bottom center, and includes a photocell and a pickup coil. A white stripe is placed at the bottom of the CRT by a cooperative television station, and the device 120 is used to obtain vertical and horizontal sync signals for use by the control unit 14 to provide an output to the television receiver that is synchronized with the signal of the cooperative television station. The control unit then can be used for training simulation, playing games, and other purposes.

U.S. Pat. No. 3,993,861, entitled "Digital Video Modulation and Demodulation System," also for an invention of Baer, discloses a system broadly similar to that described in the previous paragraph, wherein there is generated a television picture signal that in addition to the usual video content has a data content provided as video information in one or more selected areas or cells of the picture. This composite television picture signal may be provided via prerecorded video tape or disc directly coupled to a television receiver or broadcast or distributed over a cable television system. The data are provided as binary-coded, digital brightness modulation at rates exceeding the vertical picture field rate. Col. 2, lines 24–29. At the television receiver are positioned one or more light sensors opposite the cells, and the sensor outputs are sent to a decoder. Col. 2, lines 29–31; col. 2, line 66 to col. 3, line 6; col. 7, lines 13–25. The light sensor may be held in place by a suction cup. Col. 2, lines 66–68. The decoder may be equipped with a numerical display or an LED indicator (to show "CORRECT"/"YES") to provide a response indication to a viewer's solutions to quiz questions. Col. 7, lines 20–25. (Alternatively, the decoded signal may be applied to external equipment, such as a calculator, computer, tape recorder, CRT display, or a hard copy machine. Col. 2, lines 34–40; col. 9, lines 56–61.) In operation of the system, the digital data received by the light sensor is stored in the decoder, col 7, lines 26–31. The stored data is compared for a match with previously stored data, and may indicate the correct solution of a quiz question, for example. Col 7, lines 31–39. The implication is therefore that a user input may be provided to the decoder (pertinent to the information or questions being displayed on the television screen) and that the data from the user input may be compared with the data, received by the light sensor, that are provided by the program source to the television. The system may be used for purposes that include interactive training, teaching, and entertainment. Col. 1, lines 6–7 and 25–57; col. 9, lines 54–56.

See also U.S. Pat. No. 3,737,566, entitled "Television Coder and Decoder," and U.S. Pat. No. 4,654,700, entitled "Optical Decoder," both for inventions of Baer.

The patents described in this section, and the patents referenced by such patents, are hereby incorporated herein by reference.

SUMMARY OF THE INVENTION

In various embodiments, the present invention provides improvements over the systems described above. In one set of embodiments, there is provided an interactive display system, for use with (i) a program source having a video output signal and a digital data stream output, the digital data stream being modulated on the video output signal, and (ii) a monitor in communication with the program source for displaying the output, the display system. In a first embodiment, the system includes:

a. a data decoder, for separating the digital data stream from the video output signal;
b. a viewer control box having
   i. a user input for receiving user selections;
   ii. a data input in communication with the decoder for receiving the digital data stream; and
   iii. a program execution module in communication with the user input and the data input; and
c. a visual status display, removably attachable to the monitor, in communication with the program execution module, for displaying the current state of the module.

In a related embodiment the data decoder may include a light detector that is removably attachable to the monitor and the visual status display is mounted on the detector.

In a second embodiment of the set, the system includes:

a. a data decoder, for separating the digital data stream from the video output signal;
b. a viewer control box having
   i. a user input for receiving user selections;
   ii. a data input in communication with the decoder for receiving the digital data stream; and
   iii. a program execution module in communication with the user input and the data input; and
c. an audio transducer in communication with the program execution module, wherein the program execution module includes an arrangement for determining an audio output that is configured by the digital data stream output and responsive to the user selections.

In a further embodiment, the viewer control box includes a visual status display in communication with the program execution module for displaying the current state of the module.

In a third embodiment of the set, the system includes:

a. a data decoder, for separating the digital data stream from the video output signal;
b. a viewer control box having
   i. a user input for receiving user selections;
   ii. a data input in communication with the decoder for receiving the digital data stream; and
   iii. a program execution module in communication with the user input and the data input, wherein the program execution module includes an arrangement for scoring user selections and providing a score output; and
   iv. a data transmitter for transmitting the score output to a remote location.

In a fourth embodiment, the system includes:

a. a data decoder, for separating the digital data stream from the video output signal;
b. a viewer control box having
   i. a user input for receiving user selections;
   ii. a data input in communication with the decoder for receiving the digital data stream; and
   iii. an authentication arrangement for decrypting an authentication code that has been modulated on a portion of the video output signal associated with the program source and comparing the authentication code with a reference for authenticating the program source; and iv. a program execution module in communication with the user input and the data input.

In a similar embodiment, the authentication arrangement decrypts an authentication code that has been recorded on the case of a video storage medium associated with the program source and compares the authentication code with a reference for authenticating the program source. Both embodiments can be combined, so that decrypted code on the case is compared with the decrypted code that has been modulated on a portion of the video output signal.

In all of the foregoing embodiments, the program source may be a video storage medium, such as a video cassette or a CD-ROM. The monitor may be conveniently realized as the display of a television receiver connected to a video cassette recorder or to a CD-ROM player.

In a related set of embodiments, there is provided a video storage medium on which has been recorded video information for use with systems of the above general type. The video information is so arranged in a first embodiment that the video storage medium in a video player device produces:

a. a video output signal;

b. a digital data stream, the digital data stream being modulated on the video output signal and capable of being separated from the video output signal by a data decoder, the digital data stream providing interaction data for configuring a program pursuant to which are made user selections; and c. audio data, included in the digital data stream output, for configuring an audio output that is responsive to the user selections.

In a second embodiment, the video information is so arranged that when the video storage medium is utilized in a video player device, the device produces:

a. a video output signal;

b. a digital data stream, the digital data stream being modulated on the video output signal and capable of being separated from the video output signal by a data decoder, the digital data stream providing interaction data for configuring a program pursuant to which are made user selections; and c. an authentication code magnetically encoded on the housing of the video storage medium.

Alternatively, or in addition an authentication code may be modulated on a portion of the video output signal on which the digital data stream is modulated, so that the authentication code is received by the data decoder. The storage medium of the embodiments having an authentication code may be further implemented in a manner wherein the video information is so arranged that when the video storage medium is utilized in a video player device, the device produces audio data, included in the digital data stream output, for configuring an audio output that is responsive to the user selections.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
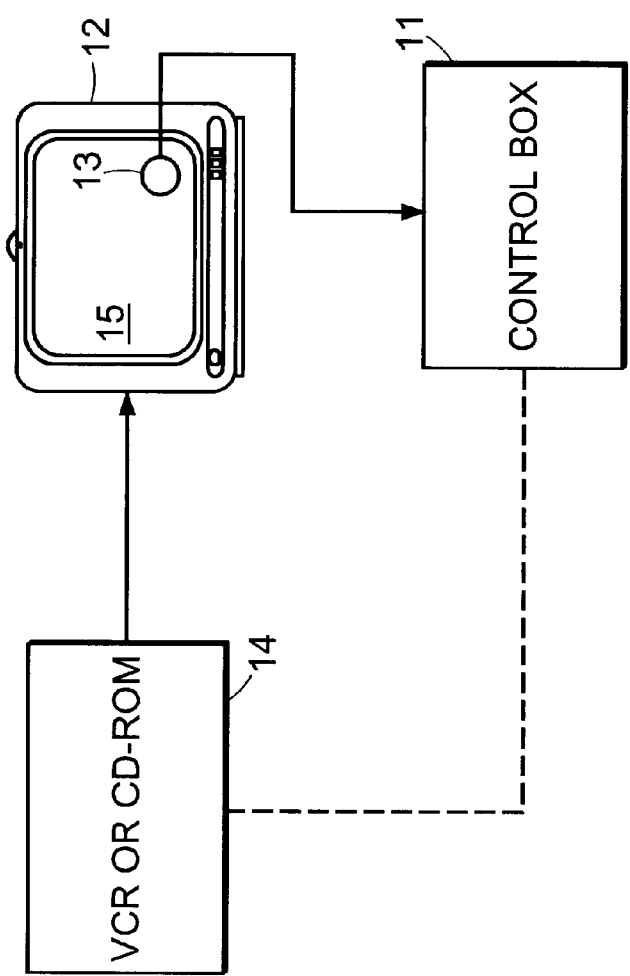
FIG. 1 is a diagram illustrating generally the use of a system according to an embodiment of the present invention.

FIG. 1 is a diagram illustrating generally the use of a system according to an embodiment of the present invention. This system is similar to that described in U.S. Pat. No. 3,993,861, described above. A video player device, such as a video cassette recorder or a CD ROM player 14 derives a video signal from a suitable video storage medium, such as a video cassette or CD ROM, as the case may be, that is inserted into the video player device. The video storage medium (for example, the video cassette or CD ROM) serves as a program source and results in a video output signal that provides a picture on television 12, which is connected to the video player device. In lieu of a television, there may be employed any suitable video monitor. A portion of the picture area of the television contains digitally modulated video. The digitally modulated video is confined to a region of the picture and is picked up by a light detector 13 removably mounted on the screen 15 of the television. The digitally modulated video is then provided as an input to viewer control box 11 to which the light detector 13 is coupled. The viewer control box 13 operates in a general manner described in the previously mentioned U.S. Pat. No. 3,993,861. A user provides an appropriate input to the control box 13 in response to questions or prompts appearing on the screen 15 of television 12.

As an alternative to deriving a digital data stream from the light detector 13 placed against the screen 15 of the television 12, the digital data stream may be derived more directly from the video output of the video player device. In such a case the player device may itself have a video output that is coupled to the viewer control box 11, as indicated by the dashed line from the VCR or CD ROM player 14 to the control box 11. In a related embodiment, instead of coupling the video player device to the control box 11, the television 12 may provide a video output that is coupled to the viewer control box 11. In either of these related alternative embodiments, the digital data stream may be encoded on the video output signal using techniques well known in the art. For example, the digital data stream may be encoded in the vertical blanking interval (VBI) of the video output signal; or it may be encoded in the horizontal blanking interval (HBI); or it may be encoded in both the VBI and the HBI. The particular encoding method is not a part of the present invention.

Figure 2:
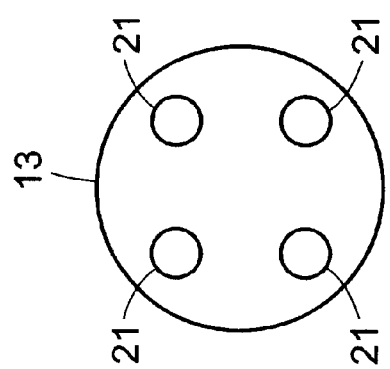
FIG. 2 is a diagram of the light detector 13 of FIG. 1 showing the visual status display 21.

FIG. 2 is a diagram of the light detector 13 of FIG. 1 showing the visual status display 21. The visual status display is here shown as an array of four light emitting diodes 21. They are placed on the viewer side of the light detector 13, so that when the light detector 13 is in place, the light emitting diodes can be seen by the user of the system. Light emitting diodes 21 constitute a display used in connection with the control box 11. In this manner, a user is able to view simultaneously the light emitting diodes 21 and the television picture screen 15. As discussed in the case of U.S. Pat. No. 3,993,861, the light detector 13 may be attached to the picture screen 15 by means such as a suction cup, permitting ready attachment and removal of the light detector 13 from the screen 15.

As an alternative to the use of an array of light emitting diodes, there may be employed any suitable display, for example, a pixel-addressed liquid crystal display, that may be removably attached to the screen 15. Indeed, it is within the scope of the present invention, where no light detector is employed, and the digital data stream is derived more directly from the video output signal, to removably mount a suitable display, for example, using one or more suction cups, in a position on or proximate to the screen 15.

Figure 3:
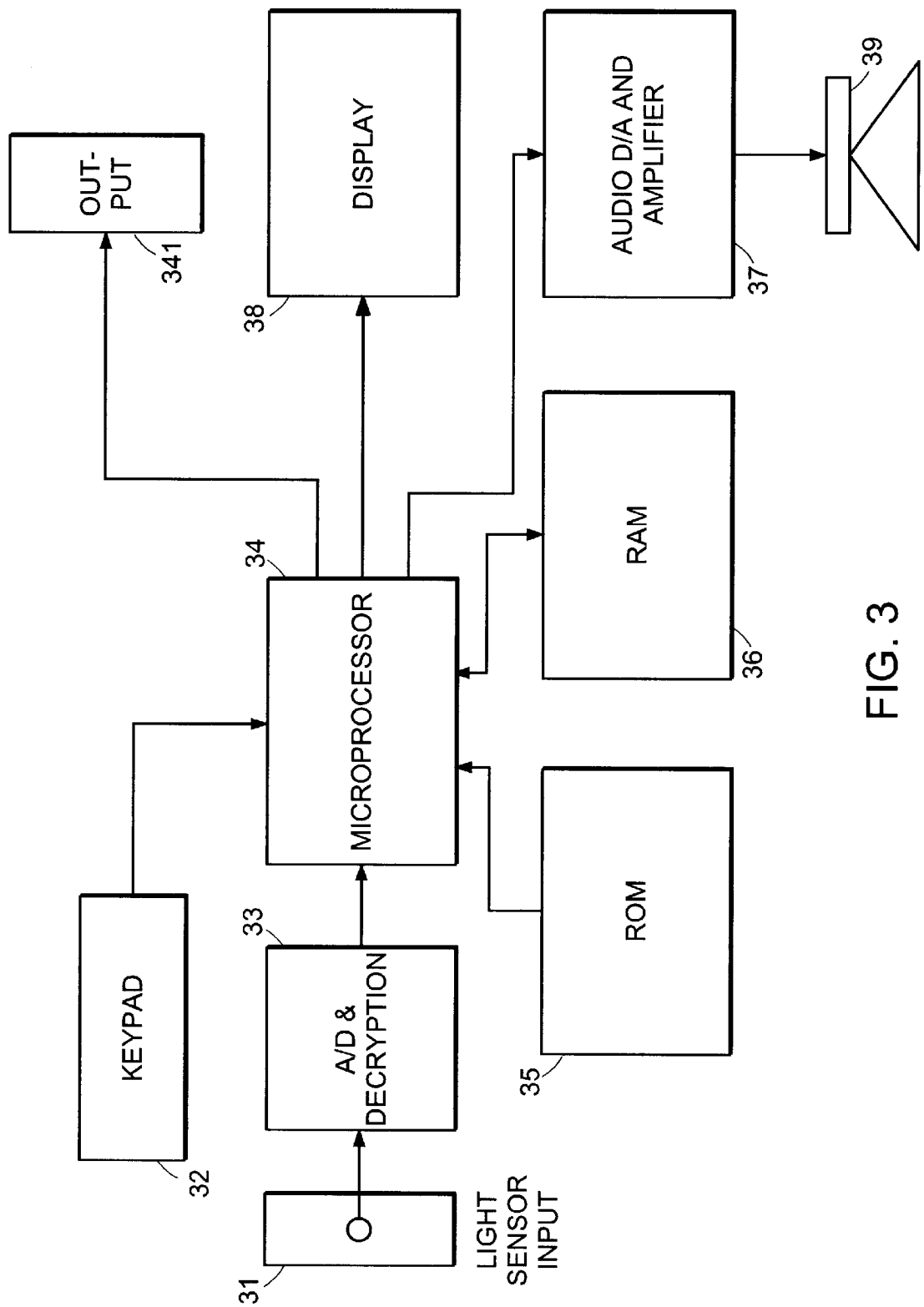
FIG. 3 is a diagram of the viewer control box 11 of FIG. 1.

FIG. 3 is a diagram of the viewer control box 11 of FIG. 1. Input from the light detector 13 is provided as a light sensor input 31 in FIG. 3. The light detector provides an analog output that in fact reflects a digital data stream output from the program source, which is a cassette or a CD ROM in item 14 of FIG. 1. This data stream output affects a program being run by microprocessor 34. In operation, the user enters responses constituting user selections via key pad 32. The microprocessor at boot up is loaded via ROM 35, and data from the data stream are stored as necessary in RAM 36, along with user selections from keypad 32 as necessary. The digital data stream from light sensor input 31 is converted to digital form by item 33, which includes an analog-to-digital converter. The data stream may optionally include information that configures an audio output that is responsive to the user selections. In this way, the user may hear an audio signal that is pertinent to the selections entered by keypad 32. The audio output is realized by audio digital-to-analog converter and amplifier 37, which is coupled to loudspeaker 39. The microprocessor 34 is also coupled to a, display 38, which may be realized by the array of light emitting diodes 21, discussed above, or optionally by other means known in the art, including, for example, a pixel-addressable liquid crystal display. Output port 341, including a data transmitter is provided for transmitting data, such as a score for the user selections, to a remote location.

In an embodiment where no light detector is employed, and the digital data stream is derived more directly from the video output signal, in lieu of the light sensor input 31 there is a direct input for a signal representative of the video output signal from the program source. In such an embodiment, the digital data stream is demodulated from the video output signal's representative, using techniques known in the art. Such demodulation is provided as a function of box 33 in lieu of simple analog-to-digital conversion. As used in this description and the following claims, the term "data decoder" means any arrangement for recognizing and separating the digital data stream from the video output signal, including (i) a light detector 13 mounted to the screen 15 and coupled to an analog-to-digital converter to provide the digital data stream as an output, or (ii) a demodulator coupled to receive a signal representative of the video output signal and providing the digital data stream as an output.

Additionally, the video storage medium (such as a video cassette, for example) may be provided with an authentication code to reduce the risk of unauthorized duplication. One way to provide such an authentication code is to provide encoding on the digital data stream itself. In one embodiment, magnetic transitions on the video tape giving rise to the data stream may themselves be modulated. Such modulation would appear to an untutored engineer as noise, but may in fact carry encrypted data that can be used to activate and enable the control box 11 in accordance with a portion of the program stored in ROM 35 or RAM 36.

Numerous other encryption techniques may be used for authentication with this and other video storage media. For example, each field or each frame of the picture defined by the video output signal may embed one or more bytes of an authentication code, which requires multiple frames for transmittal, but which may, for example, be transmitted several times repeatedly over the first 60 frames of the video output signal.

Decryption of the authentication code that is applied to the digital data stream or otherwise created is accomplished by box 33.

Alternatively, the case of the video storage medium (for example, the video cassette) may itself be encoded. Thus, magnetic recording tape with a key could be applied to the container of the video storage medium, such as the spine of a cassette itself. In operation, or storage medium case (for example, the cassette spine) is passed over a magnetic reader in the control box 11 so as to read the recorded data. The video storage medium (for example, the cassette) is then loaded into the video player device (such as the video cassette recorder) and the control box may compare the digital key recorded on the case with a digital key recorded as part of the digital data stream in the manner described above. If there is a discrepancy, the control box 11 becomes inoperative and, if desired, may make an audible announcement.

Figure 4:
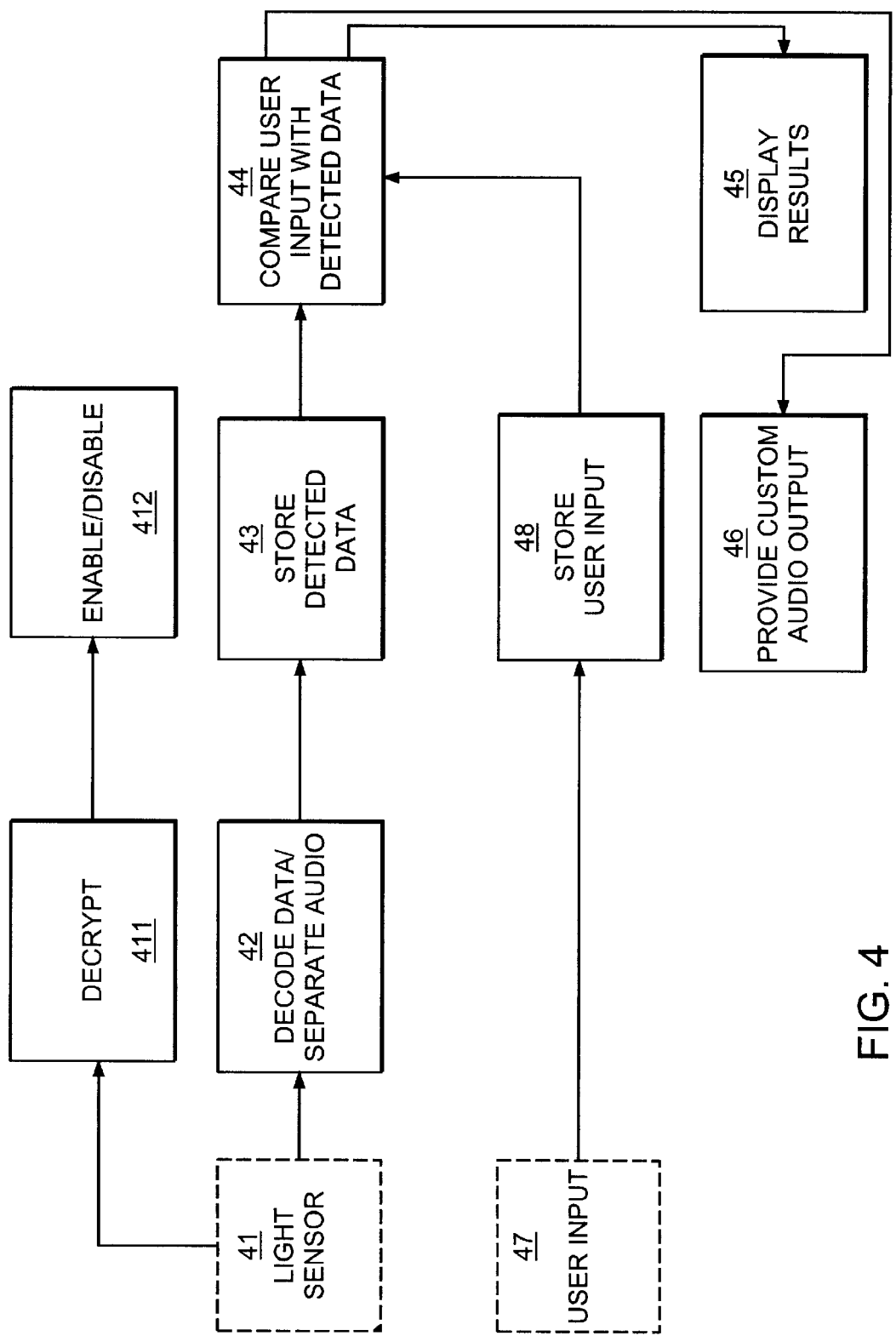
FIG. 4 is a diagram illustrating principal functions of the control box 11 of FIG. 3.

FIG. 4 is a diagram illustrating principal functions of the control box 11 of FIG. 3. Input from the light sensor 41 is first subject to decryption in box 411, which drives the enable/disable determination shown in box 412. These functions are handled under control of the microprocessor 34 of FIG. 3. The digital data stream picked up by the light sensor input at item 41 is subject decoding in box 42, and in addition, audio control and/or audio wave form signals are separated from the stream in box 42. Pertinent data from the digital data stream are then stored in item 43 while user input from the keypad 32 and shown as item 47 in FIG. 4, is stored in box 48. In box 44, the stored data from the digital data stream are compared with the stored user input data, and the result of the comparison is displayed in box 45. In addition, the result of the comparison can be used to provide a custom audio output as shown by box 46.

In a manner analogous to the discussion in connection with FIG. 3, in an embodiment where no light detector is employed, and the digital data stream is derived more directly from the video output signal, in lieu of the light sensor input 41 there is a direct input for a signal representative of the video output signal from the program source. In such an embodiment, the digital data stream is demodulated from the video output signal's representative, using techniques known in the art. Such demodulation is provided as a function of box 42. The decryption function 411 may then be applied with respect to function of box 42. Alternatively, or in addition, however, as discussed previously, there may be employed a code reader capable of reading a magnetically encoded tape applied directly to the case of the video storage medium.

What is claimed is:

1. An interactive display system, for use with (i) a program source from a video player device providing an associated video output signal and a digital data stream, the digital data stream being modulated on the video output signal to provide control data for user interaction with the program source, and (ii) a monitor in communication with the program source for displaying the output, the display system comprising:

(a) a data decoder, for separating the digital data stream from the video output signal;

(b) a viewer control box having
   (i) a user input for receiving user selections;
   (ii) a data input in communication with the decoder for receiving the digital data stream; and
   (iii) a program execution module in communication with the user input and the data input; and
(c) a visual status display, removably attachable to the monitor, in communication with the program execution module, for displaying the current state of the module so as to enable real time user interaction with the program source.

2. A display system according to claim 1, wherein the data decoder includes a light detector that is removably attachable to the monitor and the visual status display is mounted on the detector.

3. A system according to claim 1, wherein the program source is a video storage medium, such medium being one of a video cassette and a CD-ROM.

4. An interactive display system, for use with (i) a program source from a video player device providing an associated video output signal and a digital data stream output, the digital data stream being modulated on the video output signal to provide control data for user interaction with the program source, and (ii) a monitor in communication with the program source for displaying the output, the display system comprising:
   (a) a data decoder, for separating the digital data stream from the video output signal;
   (b) a viewer control box having
      (i) a user input for receiving user selections;
      (ii) a data input in communication with the decoder for receiving the digital data stream; and
      (iii) a program execution module in communication with the user input and the data input; and
   (c) an audio transducer in communication with the program execution module, wherein the program execution module includes an arrangement for determining an audio output that is configured by the digital data stream output and responsive to the user selections;
   so that the digital data stream provides control data to the program execution module so as to enable real time user interaction with the program source.

5. An interactive display system according to claim 4, wherein the viewer control box includes a visual status display in communication with the program execution module for displaying the current state of the module.

6. An interactive display system, for use with (i) a program source from a video player device providing an associated video output signal and a digital data stream output, the digital data stream being modulated on the video output signal to provide control data for user interaction with the program source, and (ii) a monitor in communication with the program source for displaying the output, the display system comprising:
   (a) a data decoder, for separating the digital data stream from the video output signal;
   (b) a viewer control box having
      (i) a user input for receiving user selections;
      (ii) a data input in communication with the decoder for receiving the digital data stream; and
      (iii) a program execution module in communication with the user input and the data input, wherein the program execution module includes an arrangement for scoring user selections and providing a score output; and
      (iv) a data transmitter for transmitting the score output to a remote location;
   so that the digital data stream provides control data to the program execution module so as to enable real time user interaction with the program source.

7. An interactive display system, for use with (i) a program source from a video player device providing an associated video output signal and a digital data stream output, the digital data stream being modulated on the video output signal to provide control data for user interaction with the program source, and (ii) a monitor in communication with the program source for displaying the output, the display system comprising:
   (a) a data decoder, for separating the digital data stream from the video output signal;
   (b) a viewer control box having
      (i) a user input for receiving user selections;
      (ii) a data input in communication with the decoder for receiving the digital data stream; and
      (iii) an authentication arrangement for decrypting an authentication code that has been modulated on a portion of the video output signal associated with the program source and comparing the authentication code with a reference for authenticating the program source; and
      (iv) a program execution module in communication with the user input and the data input;
   so that the digital data stream provides control data to the program execution module so as to enable real time user interaction with the program source.

8. An interactive display system, for use with (i) a program source from a video player device providing an associated video output signal and a digital data stream output, the digital data stream being modulated on the video output signal to provide control data for user interaction with the program source, and (ii) a monitor in communication with the program source for displaying the output, the display system comprising:
   (a) a data decoder, for separating the digital data stream from the video output signal;
   (b) a viewer control box having
      (i) a user input for receiving user selections;
      (ii) a data input in communication with the decoder for receiving the digital data stream; and
      (iii) an authentication arrangement for decrypting an authentication code that has been recorded on the case of a video storage medium associated with the program source and comparing the authentication code with a reference for authenticating the program source; and
      (iv) a program execution module in communication with the user input and the data input;
   so that the digital data stream provides control data to the program execution module so as to enable real time user interaction with the program source.

9. A system according to claim 8, further comprising a second authentication arrangement for decrypting a second authentication code that has been modulated on a portion of the video output signal associated with the program source wherein the reference is the second authentication code.

10. A video storage medium on which has been recorded video information constituting a program source, the video information so arranged that the video storage medium is utilized in a video player device, the device produces:
   (a) a video output signal;
   (b) a digital data stream, the digital data stream being modulated on the video output signal and capable of being separated from the video output signal by a data decoder, the digital data stream providing control data for real time user interaction with the program source pursuant to which are made user selections; and (c) audio data, included in the digital data stream output, for configuring an audio output that is responsive to the user selections.

11. A video storage medium on which has been recorded video information constituting a program source, the video information so arranged that the video storage medium is utilized in a video player device, the device produces:

(a) a video output signal;

(b) a digital data stream, the digital data stream being modulated on the video output signal and capable of being separated from the video output signal by a data decoder, the digital data stream providing control data for real time user interaction with the program source pursuant to which are made user selections; and (c) an authentication code magnetically encoded on the housing of the video storage medium.

12. A video storage medium on which has been recorded video information constituting a program source, the video information so arranged that the video storage medium is utilized in a video player device, the device produces:

(a) a video output signal;

(b) a digital data stream, the digital data stream being modulated on the video output signal and capable of being separated from the video output signal by a data decoder, the digital data stream providing control data for real time user interaction with the program source pursuant to which are made user selections; and (c) an authentication code modulated on a portion of the video output signal on which the digital data stream is modulated, so that the authentication code is received by the data decoder.

13. A video storage medium according to claim 12, further comprising a second authentication code magnetically encoded on the housing of the video storage medium.

14. A video storage medium according to claim 13, wherein the video information is so arranged that the video storage medium is utilized in a video player device, the device produces:

audio data, included in the digital data stream output, for configuring an audio output that is responsive to the user selections.

15. A video storage medium according to claim 12, wherein the video information is so arranged that the video storage medium is utilized in a video player device, the device produces:

audio data, included in the digital data stream output, for configuring an audio output that is responsive to the user selections.

\* \* \* \* \*